Aug. 28, 1934.  L. S. PALMER  1,971,500

HOSE CONNECTION

Filed Feb. 1, 1932

Inventor
LAWRENCE S. PALMER
By W. B. Bowman
Attorney

Patented Aug. 28, 1934

1,971,500

UNITED STATES PATENT OFFICE 1,971,500

HOSE CONNECTION

Lawrence S. Palmer, San Diego, Calif.

Application February 1, 1932, Serial No. 590,038

8 Claims. (Cl. 137—90)

My invention relates to hose connections, and the objects of my invention are:

First, to provide a hose connection which is easy to secure or remove from a hydrant, even under conditions which would necessitate the use of a tool upon a conventional hose connection;

Second, to provide a hose connection of this class which enables the hose to be joined to a hydrant or faucet located in an awkward or out of the way place;

Third, to provide a hose connection of this class which reduces to a minimum the danger of the hose kinking or breaking near its juncture with the hydrant;

Fourth, to provide a hose connection which eliminates the need of grasping the hose itself when making a connection thereby reducing the danger of soiling ones hands when connecting the hose;

Fifth, to provide a hose connection of this class which may be attached to a conventional hose coupling member, and Sixth, to provide on the whole a novelly constructed hose connection, which is durable, efficient in its action, and which will not readily deteriorate or get out of order.

Figure 1:
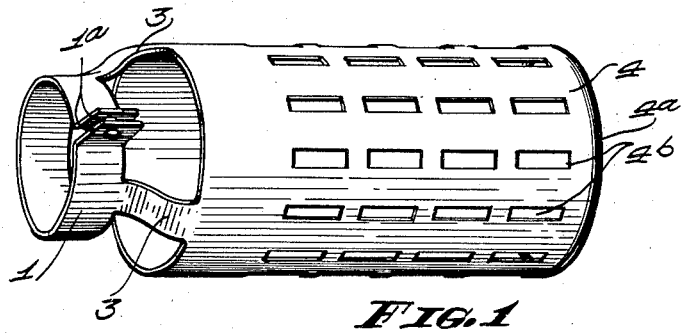
Figure 2:
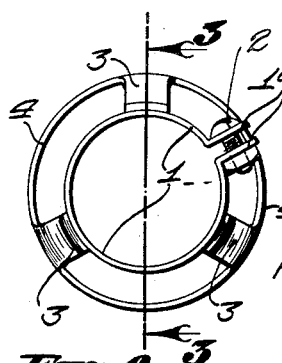
Figure 3:
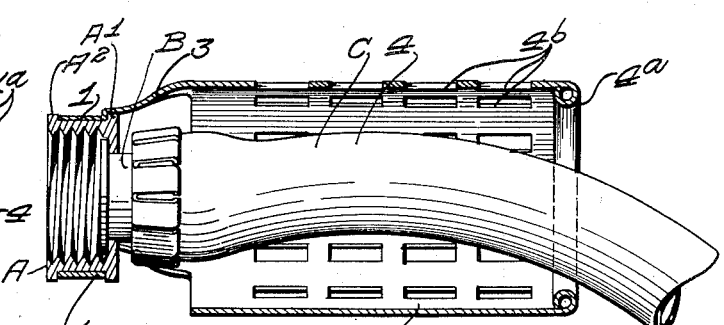

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a perspective view of my hose connection; Fig. 2 is an end elevational view thereof; and Fig. 3 is a sectional view thereof through 3—3 of Fig. 2, showing the adjacent portions of a hose and fitting in conjunction therewith.

Similar characters of reference refer to similar parts and portions throughout the several views of the drawing.

Collar 1, securing screw 2, webs 3, and hand grip member and shield 4, constitute the principal parts and portions of my hose connection.

The conventional hose fitting with which my device may be used comprises an internally threaded end member A which is revolubly mounted upon a shank B suitably secured in the end of a hose C. The outer periphery of the end member A is usually provided with narrow ridges A1 at its axial extremities which form therebetween a shallow channel A2.

My device includes a collar 1 adapted to fit in the channel A2, as shown best in Fig. 3. The collar 1 is slit and provided with outwardly extending lugs 1a arranged in relatively close proximity to each other. These lugs are adapted to be connected by a screw and nut 2 so that the collar may be clamped tightly upon the end member A.

The collar 1 is provided with a plurality of web portions 3 extending axially and outwardly therefrom over the end of the hose C. The rearward extremities of the webs 3, that is the extremities remote from the collar 1, connect to a shield 4.

The shield 4 is in the form of a cylinder and is disposed in substantially coaxial relation with the collar 1. The shield 4 is considerably larger in diameter than the collar 1 so that the hose C is capable of bending considerably before engaging the walls of the shield 4. The rearward extremity of the shield 4 is provided with a rolled portion 4a which is engaged by the hose should the hose be bent in angular relation with the shield. The diameter of the shield 4 is such as to afford ample leverage for screwing the fitting or end member A upon the hydrant. Furthermore, the shield enables one to reach in under obstructions so as to reach awkwardly positioned hydrants or faucets.

If desired, the surface of the shield 4 may be arranged with slots 4b or any other suitable means which provides a sufficient grip.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a hose connection, a hose fitting including a support fixed in the end of a hose, a revoluble connecting member mounted upon said support, a hand grip sleeve enveloping the end portion of said hose, and spring clamp means for supporting said sleeve from said connecting member whereby the sleeve is revoluble with said connecting member.

2. In a hose connection, a hose fitting including a support fixed in the end of a hose, a revoluble connecting member mounted upon said support, a clamping collar secured to said fitting, webs extending from said collar over said hose, and a hollow perforate combined hand spring member and shield supported from said webs reinforced at its extended end.

3. In a guard and wrench means for hose connections, the combination with a revoluble coupling member, of a sleeve secured to said coupling member and extending therefrom around the hose, said sleeve being materially larger in diameter than the coupling member and hose to form a wrench for turning said coupling member.

4. In a guard and wrench means for hose connections, the combination with a revoluble coupling member, of a sleeve secured to said coupling member and extending therefrom around the hose, said sleeve being materially larger in diameter than the coupling member and hose to form a wrench for turning said coupling member, a guard ring at the extended end of the sleeve adapted to receive the hose and limit bending of the hose relative to the coupling.

5. In a guard and wrench means for hose connection, the combination with a revoluble coupling member, of a body member adapted to fit loosely over a hose, a collar member securable to said coupling member and means connecting said body member in spaced but rigid relation with said collar, whereby the body member is substantially free from drippings seeping along the coupling collar and hose.

6. In a hose fitting, a fixed coupling element secured in the end of a hose, a revoluble threaded coupling element carried by said fixed element, and an enlarged sleeve secured to said revoluble element and extending therefrom over the hose in spaced relation with the hose, the sleeve being materially larger in diameter than said coupling element to form a wrench means therefor.

7. In a hose fitting, a fixed coupling element secured in the end of a hose, a revoluble threaded coupling element carried by said fixed element, and an enlarged sleeve secured to said revoluble element and extending therefrom over the hose in spaced relation with the hose, the sleeve being materially larger in diameter than said coupling element to form a wrench means therefor, said sleeve being apertured adjacent said coupling to form means for draining drippings from the coupling and hose without being carried to said sleeve.

8. In a hose fitting, a fixed coupling element secured in the end of a hose, a revoluble threaded coupling element carried by said fixed element, a guard ring adapted to receive the hose, a sleeve secured to the coupling element disposing the guard in spaced relation with the coupling element, said sleeve being materially larger than said coupling to provide leverage facilitating connecting and disconnecting of the coupling element.

LAWRENCE S. PALMER.